Feb. 21, 1950

H. R. RAFTON 2,498,005

TREATMENT OF PIGMENT COMPRISING CALCIUM CARBONATE

Filed Oct. 31, 1946

Inventor
HAROLD R. RAFTON

By
Attorney

Patented Feb. 21, 1950

2,498,005

UNITED STATES PATENT OFFICE 2,498,005

TREATMENT OF PIGMENT COMPRISING CALCIUM CARBONATE

Harold R. Rafton, Andover, Mass., assignor to Raffold Process Corporation, a corporation of Massachusetts Application October 31, 1946, Serial No. 706,907

14 Claims. (Cl. 23—193)

My invention relates to the treatment of pigment.

The present application is a continuation in part of my two copending applications, Serial No. 455,367, filed August 19, 1942, and Serial No. 584,158, filed March 22, 1945, both now abandoned.

The principal object of my invention is the treatment of a pigment, particularly calcium carbonate and more particularly artificially prepared calcium carbonate, to impart specific and controlled characteristics.

Other objects and advantages of this invention will become apparent during the course of the following description.

Calcium carbonate may be artificially prepared in a variety of ways, all of which are well known. Examples of some of the common methods are: by reaction of lime, or calcium hydroxide, and carbon dioxide; by the causticizing reaction, e. g. the reaction of sodium carbonate and lime; by the reaction of an alkali metal carbonate such as sodium carbonate and a soluble calcium salt such as calcium chloride; by the elimination of carbon dioxide from calcium bicarbonate solution by heat or reduction of pressure, or by reaction of calcium bicarbonate with lime; or by any combination of the above. Sodium bicarbonate is sometimes utilized in the reaction, as is also potassium or ammonium carbonate, and sodium, potassium or ammonium hydroxide may be present in certain cases. When I speak of artificially prepared calcium carbonate, I mean calcium carbonate artificially prepared by the above mentioned or other known methods in contradistinction to naturally occurring calcium carbonate such as marble, limestone, natural chalk, marl, or refined forms of these materials such as the comminuted form, usually ground to varying degrees of fineness, and which may be subjected to mechanical, air or water separation or classification, and may be otherwise purified if desired.

The calcium carbonates artificially prepared vary considerably in physical characteristics and possibly also in chemical constitution and crystalline form or other form. Some may be relatively coarse in particle size, others may be relatively fine, examples of the latter being the calcium carbonates made by the processes disclosed in the patents issued to Rafton and Brooks, No. 2,058,503, of October 27, 1936, and No. 2,062,-255, of November 24, 1936. In many instances a given artificially prepared calcium carbonate, although entirely satisfactory from the standpoint of certain characteristics such for example as particle size, alkalinity, softness and the like, may be unsatisfactory because of high adhesive requirement, high oil absorption, or other characteristic. In many cases such unsatisfactory characteristic makes it infeasible, if not impossible, to market an artificially prepared calcium carbonate otherwise satisfactory or highly desirable for certain uses, or if possible to market it at all, only at a price lower than it would otherwise command.

As disclosed in my Patent No. 2,385,379, issued September 25, 1945, momentary application of pressure, in certain cases accompanied by momentary attrition, imparts to artificially prepared calcium carbonate certain new characteristics, such as lowered oil absorption, lowered adhesive requirement and the like. As disclosed in my Patent No. 2,383,509, issued August 28, 1945, the passages of a slurry of artificially prepared calcium carbonate at high velocity through a nozzle and if desired against a target, imparts similar new characteristics. And as disclosed in my copending applications Serial Nos. 449,492, filed July 2, 1942, and 453,469, filed August 3, 1942, striking, respectively, a slurry or paste which comprises pigment comprising calcium carbonate, with a striking surface of a rotor element having a peripheral velocity of not less than substantially 30 feet per second, likewise imparts similar new characteristics. My applications Serial Nos. 449,492 and 453,469 have now been abandoned in favor, respectively, of my copending continuing application Serial No. 718,649, filed December 27, 1946, and my copending continuation in part application Serial No. 740,831, filed April 11, 1947. My application Serial No. 718,649 has now matured into Patent No. 2,447,532, issued August 24, 1948, and my application Serial No. 740,831, has now matured into Patent No. 2,451,448, issued October 12, 1948.

The processes of Patents No. 2,385,379 and 2,383,509 are operable only with pigment comprising artificially prepared calcium carbonate, while those of applications Serial Nos. 449,492 and 453,469 are operable with pigment comprising calcium carbonate both where the calcium carbonate is artificially prepared and where it is naturally occurring.

I have now devised another process for treating pigment comprising calcium carbonate, which is applicable to pigment in dry or somewhat moist form. My process comprises striking a dry or slightly moist pigment comprising calcium carbonate with a rapidly rotating rotor element provided with striking surface or surfaces, i. e. with a member or members adapted for striking. This process has certain advantages over the process described in my Patent No. 2,385,379, the only one of my four other processes above referred to capable of treating pigment in dry or somewhat moist form. Firstly, my present process is applicable to pigment comprising calcium carbonate including artificially prepared as well as naturally occurring calcium carbonate, while my prior process is limited to the former. Secondly, my present process produces a treated pigment which disperses more readily in liquid suspensions or pastes, without grinding or the like, than is sometimes the case with the treated product of my prior process. Thirdly, my present process in general requires less expensive equipment, and has other advantages which will become apparent later herein.

By my present process I am able to reduce the adhesive requirement of calcium carbonates 5 to 50% or more, when used, for example, in coated paper or in water paints. I am also able to reduce the oil absorption of calcium carbonates 5 to 40% or more, when used, for instance, in paints, enamels and other coatings, and putties; and in general I am able to impart greatly improved qualities to calcium carbonates.

Artificially prepared calcium carbonates of all degrees of fineness respond to my process claimed herein, from coarse particle size through varying degrees of fineness up to such fineness that they may be said to approach or be in the colloidal condition. Naturally, however, the absolute magnitude of the effect obtained is not the same or even similar with every sample. Pigments which contain artificially prepared calcium carbonate together with an additional constituent or constituents such for example as calcium carbonate magnesuim hydroxide and calcium carbonate magnesium basic carbonate also respond to my process as does naturally occurring calcium carbonate, such as limestone, marble, marl and chalk, for example in comminuted form such as they occur commercially, as well as pigment comprising naturally occurring calcium carbonate, in which there is an additional constituent or constituents present, such as magnesium limestone or dolomite, in finely divided form.

Any one of a large variety of rotor elements, having striking surface or surfaces of various kinds, located, for example on the end face or faces or on the peripheries of the rotor elements, may be employed in my process. The striking surfaces may be integral or rigidly attached, or need not be, e. g. they may be attached by pins, hinges, or the like, and if desired may swing out, for example, by centrifugal force. While machines embodying any such rotor elements may be used for practicing my invention, I prefer to use a hammer mill. My preferred method of feeding the hammer mill is by a feed, such as a screw conveyor feed arranged radially. I may also use a non-radial feed, but such is usually not so effective as the radial feed. I may also, but in most cases not so advantageously, use a mill employing a circular saw or saws. The latter is known as the "Rafton mill" and is disclosed in my copending application, Serial No. 479,373, filed March 16, 1943, now Patent No. 2,448,049. (In a Rafton mill, material is introduced into the path of the teeth of a circular saw rotating rapidly in a casing substantially spaced from the saw, and the material after being struck by the teeth of the saw discharges through an outlet in the bottom of the casing.)

In the preferred practice of my invention I feed pigment comprising calcium carbonate in a substantially dry state in a finely divided condition to a hammer mill, and collect the pigment discharged therefrom. I may then return the discharged pigment into the feed inlet of the hammer mill and pass it again through the mill one or more times, providing the desired change has not been effected in the characteristics of the pigment by the first passage through the mill.

The accompanying drawings depict apparatus suitable for practicing my invention. The drawings and the detailed descriptions thereof are intended to be illustrative only and not limiting. In this showing:

Figure 1:
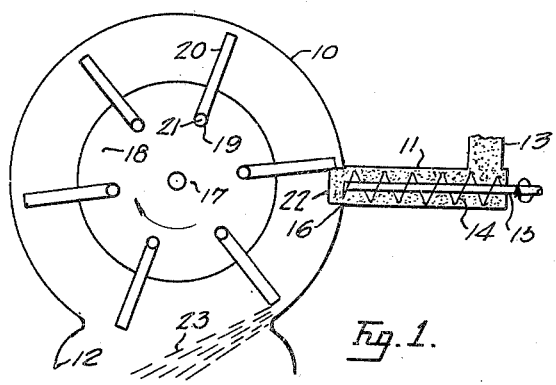
Figure 1 is a front elevational view, in diagrammatic form, of a hammer mill to which pigment comprising calcium carbonate is fed by a screw conveyor arranged substantially radially, the pigment being delivered thereby directly into the path of the hammers and discharged through an opening in the mill casing.

In Figure 1, casing 10 (having a front and a back, both not shown) is provided with inlet conduit 11 and outlet 12. Inlet conduit 11 is fed by appropriate means, such as inlet 13 (shown in fragmentary form) connected thereto at its further end, and snugly houses screw conveyor 14 mounted on shaft 15, driveable in the direction of the surrounding arrow by any suitable means (not shown), and communicating through casing 10 by means of substantially circular aperture 16 therein. Through the back of casing 10 extends shaft 17 on which is mounted plate 18, here shown as driveable in the direction of the arrow, but which is also driveable in the other direction if desired. Plate 18 is one of two similar plates (the second of which is not shown) spacedly mounted on shaft 17, in holes 19 of which hammers 20 are swivelled on pins 21 which may be integral with hammers 20. In operation, shaft 17 is driven at high speed whereby plate 18, securely affixed thereto, is rotated, thereby in turn rotating, at high speed, hammers 20 which swing out by centrifugal force substantially along radial lines of plates 18. Pigment 22 is introduced into inlet 13, advanced in inlet conduit 11 by means of screw conveyor 14, and delivered through aperture 16. Successive small quantities of pigment 22 are struck by rapidly rotating hammers 20 and the so-struck pigment 23 is discharged through outlet 12.

Figure 2:
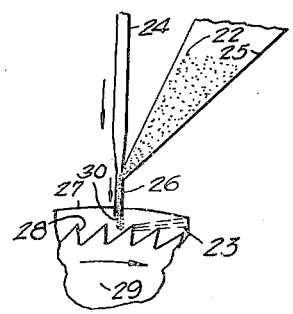
Figure 2 is a fragmentary front elevational view, in diagrammatic form, of a feed device attached to the casing of a Rafton mill.
Figure 3:
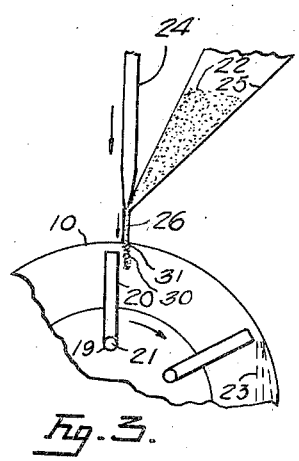
Figure 3 is a fragmentary front elevational view, in diagrammatic form, of a feed device, similar to that shown in Figure 2, but here attached to a hammer mill, similar to that shown in Figure 1.
Figure 4:
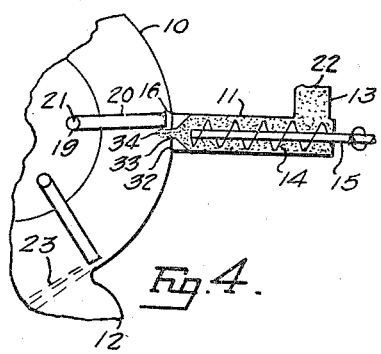
Figure 4 is a fragmentary front elevational view, in diagrammatic form, of the screw conveyor portion of a hammer mill, similar to that shown in Figure 1, except that the discharge end of the screw conveyor is provided with an extrusion nozzle.

Figures 2, 3 and 4 will be described later herein.

A hammer mill may be in many cases provided with a cage, screen or grid at its outlet, and while I may use a hammer mill so equipped, I prefer, in general, to have the outlet open for free discharge, such as is illustrated in Figure 1 (outlet 12). Provision, such as using a closed system, bags, centrifugal or cyclone collectors or the like, may be used to contain or control any dust from the hammer mill outlet.

As an example of the results obtained in the practice of my invention, Table I presents data on a number of natural and artificially prepared pigments comprising calcium carbonate treated by my process. The samples subjected to my treatment were commercial grade products, all dry and in powder form. This is the form in which they would ordinarily be employed in the arts when purchased dry. The first sample in each group is the original material, and prior to subjection to my treatment its percent casein requirement and oil absorption were determined. After passage through the hammer mill for one or more passes the same characteristics were again determined. The percent casein requirement was determined by the usual test employed in the art, i. e. spreading on paper successive aqueous pigment-casein mixes containing various percentages of casein, until a mix was obtained strong to No. 5, but weak to No. 6, Dennison wax; and the oil absorption was determined by the usual linseed oil rubout method. The first two pigments listed in Table I were from naturally occurring sources, and the others were artificially prepared by chemical reactions as indicated.

*Table I*

| Sample | Number passes through hammer mill | Per cent casein requirement | Per cent reduction in casein requirement based on the original as 100% | Oil absorption | Per cent reduction in oil absorption based on the original as 100 |
| --- | --- | --- | --- | --- | --- |
| Limestone, ground to a medium fine particle size | 0 | 8 | | 16.2 | |
| Same | 1 | 7 | 13 | 15.1 | 7 |
| Same | 5 | 6 | 25 | 13.6 | 16 |
| Same | 10 | 6 | 25 | 13.8 | 15 |
| Marl, relatively coarse particle size | 0 | 19 | | 28.0 | |
| Same | 1 | 13 | 32 | 25.4 | 9 |
| Same | 5 | 8 | 58 | 22.0 | 21 |
| Calcium carbonate, very fine particle size, made by reacting a soluble carbonate with slaked lime | 0 | 18 | | 31.0 | |
| Same | 1 | 16 | 11 | 30.5 | 2 |
| Same | 5 | 13 | 28 | 26.6 | 14 |
| Same | 10 | 12 | 33 | 24.7 | 20 |
| Calcium carbonate, fine particle size, made by reacting carbon dioxide with slaked lime | 0 | 26 | | 43.7 | |
| Same | 1 | 20 | 23 | 34.6 | 21 |
| Same | 5 | 14 | 46 | 28.7 | 34 |
| Same | 10 | 12 | 54 | 27.9 | 36 |
| Calcium carbonate, medium fine particle size, made by reacting a soluble carbonate with calcium chloride | 0 | 20 | | 26.4 | |
| Same | 1 | 18 | 10 | 26.0 | 2 |
| Same | 5 | 12 | 40 | 24.0 | 9 |
| Same | 10 | 10 | 50 | 22.2 | 16 |
| Calcium carbonate, relatively coarse particle size, made by reacting calcium bicarbonate with slaked lime | 0 | 23 | | 30.0 | |
| Same | 5 | 17 | 26 | 22.9 | 24 |
| Same | 10 | 13 | 44 | 21.5 | 28 |
| Calcium carbonate magnesium hydroxide, fine particle size, made by reacting a soluble carbonate with slaked dolomitic lime | 0 | 17 | | 32.4 | |
| Same | 1 | 16 | 6 | 30.7 | 5 |
| Same | 4 | 14 | 18 | 28.0 | 14 |
| Same | 9 | 12 | 29 | 25.4 | 22 |
| Calcium carbonate magnesium basic carbonate, very fine particle size, made by reacting carbon dioxide with slaked dolomitic lime | 0 | 36 | | 70.3 | |
| Same | 1 | 36 | 0 | 65.5 | 7 |
| Same | 5 | 30 | 17 | 59.6 | 15 |
| Same | 10 | 22 | 39 | 58.2 | 17 |

It is noted that the pigments, in dry powder form, when passed one or more times through a hammer mill are reduced very markedly in their casein requirement and oil absorption, as shown, respectively, in the 4th and 6th columns of Table I.

Not only is my process applicable to pigment comprising calcium carbonate when dry, but it is equally applicable to such pigment when it is in a somewhat moist form, i. e. when it is associated with any amount of water up to and including that amount it contains when it exists in the form of crumbs, in which form it usually contains from a small percentage up to about 20–25% or thereabouts of water, depending upon the type of the pigment. Occasionally more water may be present, as, for example, in the case of calcium carbonate magnesium basic carbonate, which is in some instances an extraordinarily bulky material and requires up to about 40% or more of water before it is converted from a powder to crumbs. If more water is present than will convert a pigment into crumbs, that situation may be readily recognized as the material begins to stick together and to be converted into a paste. Table II shows substantially the maximum percentage water content of a number of samples of various pigments comprising calcium carbonate when they are in crumbs, and of course it will be understood that crumbs exist over a comparatively wide percentage moisture range so that considerably less water than the maximum percentage may be present in any given instance before the pigment becomes powdery.

Table II

| Sample | Substantially maximum per cent water content when in form of crumbs |
|---|---|
| Limestone, ground to a medium fine particle size | 17 |
| Marl, relatively coarse particle size | 25 |
| Calcium carbonate, very fine particle size, made by reacting a soluble carbonate with slaked lime | 25 |
| Calcium carbonate, fine particle size, made by reacting carbon dioxide with slaked lime | 23 |
| Calcium carbonate, medium fine particle size, made by reacting a soluble carbonate with calcium chloride | 20 |
| Calcium carbonate, relatively coarse particle size, made by reacting calcium bicarbonate with slaked lime | 13 |
| Calcium carbonate magnesium hydroxide, fine particle size, made by reacting a soluble carbonate with slaked dolomitic lime | 27 |
| Calcium carbonate magnesium basic carbonate, very fine particle size, made by reacting carbon dioxide with slaked dolomitic lime | 41 |

There are presented in Table III, for purposes of illustration, a few representative examples of the results obtained in the practice of my invention with pigments comprising calcium carbonate in a somewhat moist form in crumbs, employing samples of the same original pigments as used in Table I, but incorporating water in the individual samples as indicated in Table II to convert them into crumbs.

Table III

| Sample | Number passes through hammer mill | Per cent casein requirement | Per cent reduction in casein requirement based on the original as 100% | Oil absorption | Per cent reduction in oil absorption based on the original as 100 |
|---|---|---|---|---|---|
| Calcium carbinate, very fine particle size, made by reacting a soluble carbonate with slaked lime | 0 | 18 | ---- | 31.0 | ---- |
| Same | 1 | 13 | 28 | 24.0 | 23 |
| Same | 5 | 11 | 39 | 21.5 | 31 |
| Same | 10 | 11 | 39 | 19.6 | 37 |
| Calcium carbonate, fine particle size, made by reacting carbon dioxide with slaked lime | 0 | 26 | ---- | 43.7 | ---- |
| Same | 1 | 22 | 15 | 27.1 | 38 |
| Same | 5 | 16 | 38 | 18.2 | 58 |
| Calcium carbonate, medium fine particle size, made by reacting a soluble carbonate with calcium chloride | 0 | 20 | ---- | 26.4 | ---- |
| Same | 1 | 11 | 45 | 25.8 | 2 |
| Same | 5 | 9 | 55 | 20.2 | 23 |
| Same | 10 | 9 | 55 | 19.6 | 26 |
| Calcium carbonate, relatively coarse particle size, made by reacting calcium bicarbonate with slaked lime | 0 | 23 | ---- | 30.0 | ---- |
| Same | 1 | 18 | 22 | 23.5 | 22 |
| Same | 5 | 14 | 39 | 21.9 | 27 |
| Same | 7 | 14 | 39 | 21.4 | 29 |

Here again as in Table I, it is seen that the pigments when passed one or more times through a hammer mill are profoundly changed in their characteristics, the casein requirement and oil absorption being very markedly reduced. It will be observed by a comparison of the data of the pigments of Table III with the data of the corresponding pigments of Table I that the effects obtained with the pigments in somewhat moist form in crumbs are in some cases greater than those obtained when the pigments are in dry powdery condition.

As the treatment in the hammer mill causes water to evaporate from the somewhat moist pigment in the form of crumbs and tends to convert it into a more or less dry powdery form, if it is desired to maintain the pigment substantially in the somewhat moist condition, it is sometimes necessary to add sufficient water thereto to effect this result, either after each pass or as required. This was the method used in conducting the tests of Table III. However, in treating a pigment containing enough water to cause it to be originally in the form of crumbs, it is sometimes treated without addition of water during the course of the treatment, and the treatment thus effects, additionally, a partial or complete drying of the pigment. I have found, however, that in several instances the results obtained are not so satisfactory when the pigment is permitted to dry out during successive passes, and thus, in general, I prefer, when operating with the somewhat moist pigment, to maintain it substantially in that condition during my treatment. But it is to be understood that my invention includes the treatment of pigment comprising calcium carbonate not only when dry in a powdery state and when somewhat moist in crumbs, but also when of any intermediate water content.

Instead of feeding the pigment in dry powder form or in somewhat moist form in crumbs by a screw conveyor into the path of the striking surfaces of the rotor element, I may convey the pigment by a gas stream, such as air, steam or the like, through a nozzle or nozzles as a gas borne stream of pigment into such path. Such a method of feeding the pigment may be employed either with a hammer mill or with a Rafton mill. A suitable apparatus for feeding a Rafton mill in this manner is shown in Figure 2 (which is adapted from Figure 46 of my copending application Serial No. 479,373 above referred to).

In Figure 2, numeral 24 is a conduit (shown in fragmentary form) for conveying gas, such as air or steam, under pressure in the direction of the arrow adjacent thereto. Hopper 25 (shown in fragmentary form), containing pigment 22 preferably in the form of powder, but if desired in the form of crumbs, preferably fine, is connected into the side of conduit 24, diagonally to the direction of the gas stream in conduit 24. The stream of gas passing the junction of conduit 24 and hopper 25 draws pigment 22 from hopper 25 with it through nozzle 26, which projects through casing 27 (shown in fragmentary form). From nozzle 26 issues, in the direction of the adjacent arrow, gas borne stream 30 of pigment 22 into the path of, and is struck by, striking surfaces of teeth 28 of circular saw 29 (shown in fragmentary form) rapidly rotating in the direction of the applied arrow. The so-struck pigment 23 discharges through the outlet (not shown) at the bottom of casing 27 together with the gas which accompanied it.

A similar apparatus may be used for feeding a hammer mill. Such an arrangement is shown in Figure 3. In Figure 3, nozzle 26 is connected to casing 10 at aperture 31. As in Figure 2, gas borne stream 30 of pigment 22 issues from nozzle 26 (in this case through aperture 31) in the direction of the adjacent arrow into the path of, and is struck by, hammers 20. The co-struck pigment 23 discharges through outlet 12 (not shown), together with the accompanying gas. It is sometimes convenient to make nozzle 26, and correspondingly aperture 31, of relatively larger cross section than shown to give a greater feed.

In both Figures 2 and 3, as will be apparent, the action of the gas passing through conduit 24, is to project pigment 22 from hopper 25 through nozzle 26 as a jet or restricted stream into the path of the percussive members.

The unit weight of pigment per volume of gas used in the apparatus of Figures 2 and 3 is not critical and may be widely varied as desired, but I prefer to use as high a concentration of pigment to gas as feasible in the interest of efficiency. While any desired pressure of gas may be used, a pressure of from 50–100 lbs. per square inch is convenient.

As to the speed of the rotor element employed in the practice of my invention, I have found that 30 feet per second is about the minimum peripheral speed at which an effect upon the characteristics of the pigment is obtained, but such relatively low speed gives only relatively minor effects, and I therefore prefer to use much higher peripheral speeds, for example 100 feet, 200 feet, 300 feet, or even higher, per second. As an example of a speed I have successfully used, the data recorded in Tables I and III were obtained with a hammer mill whose hammers had a peripheral speed of approximately 350 feet per second. While one pass in many cases gives an appreciable effect, as will be noted from Tables I and III, usually additional passes give an increased effect as is also shown in Tables I and III, and for this reason I prefer, in general, a larger number of passes, for example from 5 to 20 or more, usually about 5 to 10 being sufficient.

In the practice of my process, instead of employing the pigment in the form of powder or crumbs, I may first compress such powder or crumbs into shaped form and then subject such form to the action of the striking surfaces of a rotor element. The shaped form may be introduced through conduit 11, and extruded through orifice 33 as shaped form 34, a continuous cylinder, ribbon, sheet or the like, into the path of hammers 20. Successive small portions of shaped form 34 are struck off by the blows of hammers 20 and the so-struck pigment 23 discharged through outlet 12. If the so-struck pigment 23 is to be given more than one pass through the mill, it is reintroduced into inlet 13, and again extruded by screw conveyor 14 through orifice 33, as shaped form 34 into the path of hammers 20; and this is repeated for the number of passes desired. The smaller the dimension of shaped form 34 in the direction of travel of hammers 20, the more efficient is the process.

Inasmuch as the pigment extrudes somewhat more readily when slightly moist, say containing 5 to 15 or even 20% moisture, this is a preferable, although not essential, condition in which to have the pigment when utilizing this adaptation of my invention. Also, if desired, a small amount of adhesive, such for example as starch, may be present in certain cases to assist in the production of the shaped form of the pigment for treatment by my process.

As an example of the results obtained in my process when the pigment processed is first compressed into shaped form, Table IV presents data on several pigments thus processed, the shaped form in this instance being individually prepared shapes because of the convenience of this method of shaping when handling small samples. Each sample was originally a dry powder, moisture was added sufficient to form crumbs, and the pigment was then shaped by compacting in an appropriate mold into cylinders approximately 1″ in diameter and 1½″ long. The hammer mill used is that shown in Figure 1 with the screw conveyor 14 removed. The peripheral speed of the hammers was 350 feet per second. The cylinders were introduced through the outer end of inlet conduit 11 and urged therethrough manually, by means of a plunger, into the path of hammers 20. On passage through the hammer mill these cylinders were comminuted, and the so comminuted pigment was again molded into cylinders by addition of a slight amount of water to replace that lost by evaporation during the hammer milling operation. Each sample was subjected to 5 passes; and the original and the 5 pass samples were tested for per cent casein requirement and per cent oil absorption as before.

*Table IV*

| Sample | Number passes through hammer mill | Per cent casein requirement | Per cent reduction in casein requirement based on the original as 100% | Oil absorption | Per cent reduction in oil absorption based on the original as 100 |
|---|---|---|---|---|---|
| Calcium carbonate, medium fine particle size, made by reacting carbon dioxide and slaked lime | 0 | 26 | | 37.0 | |
| Same | 5 | 20 | 23 | 18.2 | 51 |
| Calcium carbonate magnesium hydroxide, made by reacting sodium carbonate with slaked dolomitic lime | 0 | 20 | | 32.5 | |
| Same | 5 | 17 | 15 | 21.0 | 35 |
| Naturally occurring calcium carbonate, marl, unrefined grade | 0 | 19 | | 30 | |
| Same | 5 | 10 | 47 | 17.4 | 42 | dividually prepared shapes, or a continuously extruded cylinder, ribbon, sheet or the like.

Figure 4 shows an apparatus suitable for practicing this adaptation of my invention. This is similar to Figure 1, except that here aperture 16 is fitted with extrusion nozzle 32 provided with orifice 33. Pigment 22 as powder or crumbs is advanced by screw conveyor 14 in inlet con- It is noted that the pigments, when processed in shaped form, are reduced markedly in their casein requirement and oil absorption as shown, respectively, in the 4th and 6th columns of Table I.

When operating as a continuous process, equipment other than extrusion nozzles is available for delivering pigment in shaped form into the path of the striking surfaces of the rotor element, e. g. pigment may be delivered as a sheet or ribbon by causing it to issue between two cooperating pressure rollers or by using one roller on a belt, or by other known means; but each of these involves some mechanical complication or the like which makes it less desirable than the extrusion nozzle arrangement referred to above.

While good results are obtained by this adaptation of my invention as shown in Table IV above, this adaptation is more difficult of operation than is the use of powder or crumbs, and therefore I prefer to use the pigment in the form of powder or crumbs as previously described.

My process in certain instances produces an increase in gloss, for example in Table I in the case of the very fine particle size calcium carbonate made by reacting a soluble carbonate with slaked lime, the original gloss of 50.0%, was increased to a gloss in the 10 pass sample of 57.0%, an increase of 14% (based on the original as 100%). The per cent gloss was obtained by calendering coated sheets having the proper adhesive strength of coating (strong to No. 5 Dennison wax, but weak to No. 6), giving each sheet two passes through the nip of a calender for coated paper, and then determining the per cent gloss on an Ingersoll Glarimeter.

Whereas in my process a substantial part of the reduction effected in adhesive requirement may usually be obtained in one or a few passes, with only a smaller reduction in subsequent passes, in many cases the maximum effect being obtained in approximately 20 passes, it sometimes happens that the properties of the pigment treated, other than reduction in adhesive requirement, for example, the gloss imparted to paper, may continue to be enhanced by subjection to further passes. It is thus apparent, as for example when the pigment is to be used in coated paper, where although the reduction in adhesive requirement is of great importance, nevertheless improved gloss is also sought after, it is desirable in any given case to determine by trial what number of passes should be given in order to obtain as nearly as feasible the qualities wanted in a pigment in their desired degrees.

While I may, if desired, carry out my process either at atmospheric, superatmospheric or subatmospheric pressure, that is, in respect to the pressure of the gas, such as air, surrounding the rotor element, I prefer to operate substantially at atmospheric pressure. However, owing to a fan-like action of the rotor element (as well as the gas introduced when the pigment is fed as a gas borne stream), there is usually a slight pressure in the space surrounding its periphery, which raises the pressure near its periphery somewhat above atmospheric.

I have not yet determined the cause or causes of the outstanding modification of the properties of pigment comprising calcium carbonate brought about by its subjection to my process, but my theory is that it is due to some change which takes place in the surface characteristics of the individual particles due to the shock treatment received. It may be that the physical, chemical, electrical, or other condition of the pigment particles has been altered. The pigment is struck a blow or blows as it passes through the mill, and is propelled out of the path of travel of the striking members, discharging through the mill outlet. The pigment is, of course, free for movement upon, and at the points of, the striking of the blows. As the pigment is presented to the striking members peripherally, and as it is propelled substantially tangentially by the striking members, naturally the rotor element is free from contact with said pigment except in respect to its striking members.

As to particle size, there appears to be little, if any, reduction occurring in my process. Thus my process is in no sense a grinding process, nor a process to break down or disperse agglomerates or aggregates, and if any comminution of particles occurs, it is purely incidental, as any such comminution, at least in the ranges of comminution which might conceivably take place, can in no way account for the change in properties brought about by my process.

As stated previously herein, pigment treated by my process disperses more readily in pastes or slurries without grinding than does pigment processed according to my Patent No. 2,385,379; but if in certain cases it is desired to give the pigment treated by my present process a grinding action or dispersing treatment subsequent to my process, for example in a ball mill or the like, to assist in dispersing it, this of course may be given.

It is, of course, well known to treat materials in hammer mills to comminute them or break down or disperse aggregates or agglomerates therein, but as stated, this is not the process which I employ. So far as I know, no pigment comprising calcium carbonate has ever been so treated in the prior art in a hammer mill to change its properties, such as adhesive requirement and the like, nor has such pigment been treated therein with the results disclosed herein. Thus my process is not to be confused with the ordinary use of hammer mills and other striking machines, as it is wholly different. Where a hammer mill or the like is used according to the prior art practice to grind a pigment comprising calcium carbonate or to disperse aggregates or agglomerates therein: (1) it may deliver the pigment which has passed therethrough as the final product, and if that is the case, then that is the condition in which I subject it to my treatment; or (2) it may be connected in series with an air or other separator whereby the fines as produced are separated as the final product, in which case I treat the fines which have been separated, conducting the treatment on the fines subsequent to that stage where the fines would hitherto have been considered as being the final product ready for commercial use. In other words, I treat pigment which is already ground or in which any aggregates or agglomerates formerly therein have already been dispersed, or which is already in finely divided form, e. g. in the form in which it is artificially prepared, having the particle size which it would customarily possess as used or sold commercially; and, if of that grade in which any aggregates or agglomerates previously existing therein have been dispersed, being substantially free from aggregates or agglomerates.

As will be apparent, pigments comprising calcium carbonate vary widely with the individual pigment as well as with the use to which they are to be put. In some cases where a material is to be ground to produce such a pigment it will be ground finer than in others, and in some cases where the pigment is precipitated, it will be precipitated finer than in others. Moreover there are different standards as to the size of grit, oversize particles or aggregates or agglomerates and the amount thereof permissible, as to the maximum and average particle size, as well as to particle size distribution, in the various pigments and in the same pigment for various uses. One of the most widely used standards depends upon the percentage rejected on given mesh screens. Some designate percentages rejected on the coarser meshes such as 100, 150 and 200, but most of the pigments ordinarily do not contain any substantial quantity of such coarse material, and are thus specified as containing a certain or fractional percentage retained on 325 mesh (44 microns opening). For the better grades of pigments it is usually specified, sometimes additionally, that there should be substantially no, or only a limited or fractional percentage of the pigment as particles over a certain maximum size, usually 5 to 20 microns or thereabouts; in other cases an average particle size is specified; and in still other cases a definite particle size distribution is specified, frequently giving the cumulative percentage, beginning with a certain micron size down to fractional micron sizes.

Thus it will be seen that there is no one standard that can be set up for a pigment comprising calcium carbonate which has hitherto been considered ready for commercial use, in respect to oversize particles, agglomerates or aggregates, particle size, or particle size distribution. However, there is a standard of reference in any given case, and that is the particular standard for said characteristics which may have been set up in any art and is generally recognized by any given art for any particular type of pigment comprising calcium carbonate, or which may have been set up by any individual pigment manufacturer for any given pigment marketed by him. Such a standard of reference is applicable in any given case and will determine the exact nature of the pigment comprising calcium carbonate for said characteristics. I use as raw material in my process pigment comprising calcium carbonate hitherto considered to be in its finished condition in respect to those of the above characteristics which were hitherto determined thereon.

Whereas I have illustrated a reduction in adhesive requirement by showing a reduction in casein requirement, it is to be understood that similar reduction is obtained with other adhesives used in the paper industry such as starch, either unmodified, or more usually in some modified form, glue, gums or protein, proteinaceous, protein-like or protein containing adhesive derived from other sources such as soya bean, corn (zein), and the like, casein (derived from milk) in modified, combined or soluble form, as well as other materials useful as adhesives in coated paper.

As will be understood, the pigment comprising calcium carbonate treated by my present process may be used as a filler in paper, in which it may give a better finish, better feel, better opacity, inhibit or reduce dusting or the like; or as coating on paper to give a coating requiring less adhesive, which is whiter, brighter, less oil absorbent, and in some instances may have a better gloss; or in paints (including cold water paints) rubber and synthetic rubber mixes, in plastics, putty, pharmaceutical preparations, and in any other use in which it may serve as a pigment, filler, coating material, loading, reinforcing agent, compounding material, base, reacting material, or the like.

In my process I may use a pigment which comprises calcium carbonate alone, or I may include with the pigment any one or all of the following in any desired amount: other pigment, adhesive, dispersing, wetting or surface active agent, as well as any other ingredient used in a mix for coating paper, if the mix is to be used for coating paper, provided a dry or only somewhat moist mix is utilized. Likewise any dry or somewhat moist mix may be employed, comprising pigment which comprises calcium carbonate, which may constitute an industrial mix to be used for some other purpose, or any part of that mix. I may of course, if desired, employ in my process a pigment which comprises calcium carbonate moistened somewhat with water in combination with other liquid, or I may employ in my process a pigment which comprises calcium carbonate moistened somewhat with liquid, other than water, for example oil or other organic liquid.

Where a hammer mill is used which is of considerable width, the hammers are sometimes made in the shape of a broad flat bottom U, in which case the hammers are sometimes known as yokes.

By the phrase "in restricted condition," as applied to pigment comprising calcium carbonate, it is intended to mean that the pigment is present in a condition in which it will offer resistance to the percussive member at the point of percussion, and will not be prevented from substantial contact therewith by the action of the air current generated by the rapidly moving percussive members. It is, for example, in such condition, when powder or crumbs are introduced into the path of the percussive members by a feeder, i. e. conveyor, such as a screw conveyor; when shaped forms formed by the compression or extrusion of a powder or crumbs are introduced into said path; and when powder or crumbs are projected by gas into said path in the form of relatively dense but particulated masses as distinct from gaseous suspensions.

In this specification I have advanced one or more theories as partial or complete explanation of various conditions and effects, but it is to be distinctly understood that the scope of my invention is independent of theory, and that my invention is not limited or affected by the above theories or any of them, or by their validity or invalidity, as regardless of these or any other theories, the results are as stated herein.

While I have described in detail the preferred embodiments of my invention, it is to be understood that the details of procedure, the proportions of ingredients, the arrangement of steps, and the mechanical devices used, are presented for purposes of illustration only, and may be widely varied without departing from the spirit of my invention or the scope of the subjoined claims.

I claim:

1. In the treatment of a pigment comprising calcium carbonate, the method of modifying said pigment to effect an improvement in at least one of the properties of adhesive requirement, oil absorption and gloss-imparting quality of said pigment, which comprises directing said pigment in restricted condition into the path of travel of a percussive member of a rotor element, said pigment being in a state with respect to liquid content which is in the range extending from absence of liquid to a liquid content just insufficient to convert said pigment into a paste, subjecting said pigment to a percussion from said percussive member, said percussive member having a velocity of not less than 30 feet per second at the point of said percussion, said rotor element at the time of subjecting said pigment to the action of said percussive member being free from contact with said pigment except in respect to said percussive member, said pigment being free for movement upon, and at the point of, said percussion, said pigment being propelled by said percussive member out of the path of travel of said percussive member, the particle size of said pigment being substantially unchanged by subjection to the action of said percussive member.

2. The method of modifying a pigment comprising calcium carbonate which comprises directing said pigment in restricted condition into the path of travel of percussive members of a rotor element, said pigment being in a state with respect to liquid content which is in the range extending from absence of liquid to a liquid content just insufficient to convert said pigment into a paste, subjecting said pigment to percussions from said percussive members, said percussive members having a velocity of not less than 30 feet per second at the points of said percussions, said rotor element at the time of subjecting said pigment to the action of said percussive members being free from contact with said pigment except in respect to said percussive members, said pigment being free for movement upon, and at the points of, said percussions, said pigment being propelled by said percussive members out of the path of travel of said percussive members, redirecting the thus treated pigment in restricted condition into the path of travel of said percussive members, and resubjecting it to the action of said percussive members a sufficient number of times to effect a reduction in the adhesive requirement of said pigment of not less than one-tenth of the original value of said property, the particle size of said pigment being substantially unchanged by subjection to the action of said percussive members.

3. A process according to claim 2 in which the pigment comprises artificially prepared calcium carbonate.

4. A process according to claim 2 in which the pigment is in the form of powder.

5. A process according to claim 2 in which the pigment is in the form of crumbs.

6. A process according to claim 2 in which the pigment, in the form of a powder, is projected as a jet by gas.

7. A process according to claim 2 in which the pigment is compressed in shaped form.

8. A process according to claim 2 in which the velocity is not less than 100 feet per second at the points of the percussions.

9. A process according to claim 2 in which the velocity is not less than 200 feet per second at the points of the percussions.

10. A process according to claim 2 in which the velocity is not less than 300 feet per second at the points of the percussions.

11. A process according to claim 2 in which the percussive members are hammers.

12. A process according to claim 2 in which the percussive members are teeth and the rotor element is a circular saw.

13. The method of modifying a pigment comprising calcium carbonate, which comprises passing said pigment through a hammer mill, said pigment being in a state with respect to liquid content which is in the range extending from absence of liquid to a liquid content just insufficient to convert said pigment into a paste, said hammer mill being provided with a rotor element equipped with hammers rotating at a peripheral velocity of not less than 100 feet per second, said pigment being directed into the path of travel of said hammers in restricted condition, said rotor element at the time of passing of said pigment through said hammer mill being free from contact with said pigment except in respect to said hammers, said pigment being free for movement upon, and at the point of, contact with said hammers, said pigment being propelled by said hammers out of the path of travel of said hammers, until a reduction is effected in at least one of the properties of adhesive requirement and oil absorption of said pigment of not less than one-tenth of the original value of said property, the particle size of said pigment being substantially unchanged by passing through said hammer mill.

14. The method of modifying a pigment comprising calcium carbonate, which comprises passing said pigment through a circular saw type mill, said pigment being in a state with respect to liquid content which is in the range extending from absence of liquid to a liquid content just insufficient to convert said pigment into a paste, said circular saw type mill being equipped with a circular saw rotating at a peripheral velocity of not less than 100 feet per second, said pigment being free to move upon, and at the point of, the striking of each blow by the teeth of said circular saw, until a reduction is effected in at least one of the properties of adhesive requirement and oil absorption of said pigment of not less than one-tenth of the original value of said property, the particle size of said pigment being substantially unchanged by passing through said circular saw type mill.

HAROLD R. RAFTON.

REFERENCES CITED

The following references are of record in the file of this patent:

UNITED STATES PATENTS

| Number | Name | Date |
|---|---|---|
| 1,711,464 | Rupprecht et al. | Apr. 30, 1929 |
| 1,764,020 | Hopkins | June 17, 1930 |
| 1,872,891 | Church | Aug. 23, 1932 |
| 2,182,096 | Roderick | Dec. 5, 1939 |
| 2,210,835 | Jones et al. | Aug. 6, 1940 |
| 2,323,877 | Turbett | July 6, 1943 |

OTHER REFERENCES

"Crushers for Stone and Ore," by Miller, Mining Publications Ltd., London (1935), page 207.

"Chemical Machinery," by Riegel, Reinhold Publishing Co., New York (1944), pages 22–24.